Figure 1:
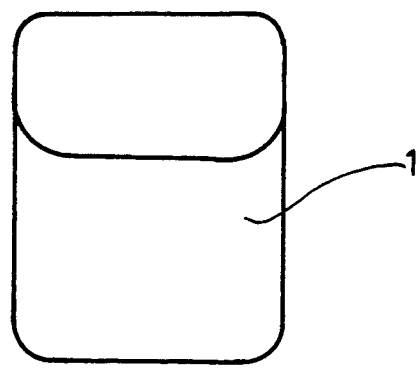

United States Patent [19]

Hargarter et al.

[11] Patent Number: 5,395,681
[45] Date of Patent: Mar. 7, 1995

[54] MULTILAYERED POLYURETHANE FILM AND THE USE THEREOF AS PACKAGING MATERIAL FOR PHOTOSENSITIVE MATERIAL

[75] Inventors: Nicole Hargarter, Hamburg; Gunter Weber, Fallingbostel, both of Germany

[73] Assignee: Wolff Walsrode AG, Walsrode, Germany

[21] Appl. No.: 168,883

[22] Filed: Dec. 16, 1993

[30] Foreign Application Priority Data

Dec. 23, 1992 [DE] Germany ............... 42 43 798.9

[51] Int. Cl.[6] .................. B32B 7/02; B32B 27/20; B32B 27/40; G03C 3/00
[52] U.S. Cl. ................... 428/215; 206/455; 206/524.9; 428/35.2; 428/35.7; 428/217; 428/220; 428/323; 428/328; 428/331; 428/423.3; 428/903.3
[58] Field of Search ............ 206/455, 524.2, 524.9; 428/35.2, 35.7, 215, 213, 216, 217, 219, 220, 323, 328, 331, 423.1, 423.3, 408, 903.3

[56] References Cited

U.S. PATENT DOCUMENTS

| | | | |
|---|---|---|---|
| 4,435,450 | 3/1984 | Coleman | 427/385.5 |
| 4,912,740 | 3/1990 | Liese, Jr. | 378/169 |
| 5,110,643 | 5/1992 | Akao et al. | 428/35.9 |
| 5,268,215 | 12/1993 | Krenceski et al. | 428/213 |

FOREIGN PATENT DOCUMENTS

| | | |
|---|---|---|
| 114802 | 1/1984 | European Pat. Off. . |
| 276018 | 1/1988 | European Pat. Off. . |
| 363092 | 9/1989 | European Pat. Off. . |
| 503334 | 2/1992 | European Pat. Off. . |
| 2529559 | 1/1984 | France . |
| 9003033 | 5/1991 | Germany . |

OTHER PUBLICATIONS

P. A. Hepburn 1982, "Polyurethane Elastomers", pp. 1–7.

*Primary Examiner*—D. S. Nakarani
*Attorney, Agent, or Firm*—Sprung Horn Kramer & Woods

[57] ABSTRACT

The present invention relates to a multilayered polyurethane film and the utilization thereof as packaging material for photosensitive, in particular photographic material.

15 Claims, 1 Drawing Sheet

MULTILAYERED POLYURETHANE FILM AND THE USE THEREOF AS PACKAGING MATERIAL FOR PHOTOSENSITIVE MATERIAL

The present invention relates to a multilayered polyurethane film and the utilisation thereof as a packaging material for photosensitive, in particular photographic, material.

BACKGROUND OF THE INVENTION

1. Field of the Invention

Packagings for X-ray film protect the photographic material in particular from light ingress, moisture and mechanical damage, as well as—in the case of dental X-ray films—contact with the saliva of the patient.

A packaging material for X-ray films must meet these functional requirements while being as economical as possible to process into the packaging units. These are generally constructed as envelopes or bags made by joining film strips and bonding them at the edges by welding, glueing or sealing. They enclose the material, the total film package comprising the actual film and any further inserts, such as for example cardboard or lead foil inserts.

2. Description of the Prior Art

GB-PS 1 098 950 relates to the construction of such a bag, and in particular names as a packaging material soft PVC film which as a result of appropriate selection of thickness and coloration offers the necessary light-shielding, and as a result of its being able to be thermally-welded also offers a simple way of bonding the components of the bag.

In addition to polyethylene (PE), GB-PS 020 183 also names in particular PVC as a suitable packaging material for X-ray films which are, however, in this case particularly utilised for the non-destructive testing of pipe welds.

Soft PVC films for the manufacture of dental X-ray film packages are widely distributed commercially and as a rule possess two layers of the same thickness, one of which is white and the other of which is black or coloured. The white layer forms the exterior of the pack and predominantly signals that the product belongs to the "white", or medical, sector. As a subordinate function it contributes to the light-shielding properties of the film. This function is fulfilled in the main by the black or coloured layer.

Since these PVC films modified for softness exhibit comparatively low mechanical strength, they are used in relatively great thicknesses of 170 to 200 μm. Only in this way is it possible to protect the film material adequately from mechanical damage from external sources. This great thickness is furthermore necessary in order to protect the film itself from being damaged by the sharp-edged photographic film material or other package components which are frequently used such as, for example, lead foil and cardboard inserts.

EP-PS 0 316 520 relates to a dental X-ray film package and explains that insertion of the package into the oral cavity of the patient is often felt to be unpleasant, if the X-ray film package is too rigid. Hard edges of the package add to the discomfort.

EP-PS 0 316 520 therefore recommends a soft or flexible material, such as for example polystyrene (PS), for manufacturing of the dental X-ray film package therein described, and in particular draws attention to the fact that selection of a packaging film which is markedly softer or more flexible than the contents of the package, that is to say photographic film material and inserts, can appreciably reduce the patient's discomfort.

For this reason, therefore, a packaging film should be sought which is of a material of great softness. The material should simultaneously possess a high degree of strength, including resistance to puncture, so that the film has a high degree of flexibility (may be as thin as possible).

EP-A 0 363 092 relates to a dental X-ray film package the structure of which minimises the risk of contact between the saliva of the patient and the photographic film material, and furthermore to a method which reduces the probability of transmission of pathogenic bacteria contained in the saliva between the patient and the operator taking the X-rays.

The first step in this method comprises sealing the photographic film material in a bag of a material which is transparent to X-rays but impermeable to saliva and microorganisms. These are further important properties of a film for packaging X-ray films.

EP-A 0 363 092 relates furthermore to the construction of an X-ray film package having the aforementioned purpose, wherein the package itself is of a thermoplastic, thermally-weldable material.

Packages of polyethylene (PE), polypropylene (PP), polycarbonate (PC), cellulose propionate and cellulose acetate are explicitly protected.

Films out of these plastics admittedly meet the requirements of impermeability to saliva and microorganisms, but they are already harder or more rigid than conventional commercial soft PVC films, and thus they do not achieve the required user-friendliness for the patient. Some, furthermore, exhibit deficiencies as regards resistance to abrasion and mechanical damage.

In order to increase the strength of the packaging material and increase its resistance to puncture, JP-PS 199 393, JP-PS 098 805, JP-PS 267 775 and EP-A 0 276 018 propose multilayered film structures.

Thus, for example, JP-PS 199 393 relates to a laminate having at least four layers comprising a porous layer, for example a mesh out of a thermoplastic polymer, a flexible layer, a layer of foamed plastics and a thermoplastic sealing layer.

In addition to the relatively high cost of production, a deficit of this structure lies in its poor material recyclability. For as a result of efforts to return used packaging materials and put them to new uses, the mechanical recyclability of a material is a very important additional requirement alongside its technological properties.

JP-PS 098 805 relates to a packaging material for films the manufacture of which involves bonding a flexible thermoplastic layer to both sides of a mesh of a thermoplastic. The raw materials named for the mesh are HDPE, LLDPE or PET, and PE, PP or PA for the flexible layers. Besides the fact that this structure is relatively rigid, it is only when, exceptionally, both the mesh and the flexible layers utilised are of PE that it can be reused without problems as material of the same kind.

JP-PS 276 775 describes the construction of a package for photosensitive photographic material and the packaging material itself. It comprises a multilayered co-extruded film of which one outer layer consists of an ethylene copolymer and the other of a polyolefin. As polyolefins PE, PE/PP copolymers, PE/PB copolymers, PP/PB copolymers, PB, PS, PMMA or PP may be used. Under some circumstances a central layer may also be co-extruded between the two covering layers.

EP-A 0 276 018 also relates to a multilayered packaging material for photosensitive materials, wherein once again one of the layers comprises an ethylene copolymer. The second layer is composed of a thermoplastic, has a modulus of elasticity greater than 40 kg/mm² and is less hygroscopic than the ethylene copolymer layer. A flexible layer, which may comprise a plastic, including a metallised plastic, paper, metal foil or for example also a non-woven fabric, is laminated on to the second layer.

The latter two patents therefore describe packaging materials which, because different materials like plastics, paper and metal and composite materials thereof are utilised, do not meet the requirements of mechanical recycling. As a rule they also fail to meet the requirements for softness and flexibility.

A further critical disadvantage of such packaging structures is that ethylene copolymers which are modified with vinyl acetate, acrylates, such as for example ethyl acrylate or methyl acrylate or acrylic acid, are not neutral in odour. The typical, acidic odour of such plastics is felt by the majority of people to be unpleasant.

A two-layer coextruded film of LDPE and HDPE, as described in JP-PS 229 500 as a packaging material for photosensitive material, is well suited to material recycling but is inadequate as regards softness and flexibility.

The packaging film for photographic films in accordance with JP-PS 021 614, a biaxially orientated PP film with PVDC coating, also exhibits a high degree of rigidity.

DE-PS 632 041 and GB-PS 056 848 in each case relate to a packaging for a stack of film material, which facilitates the insertion of the stack into a supply cassette which is part of the X-ray apparatus. For this application the softness and flexibility of the packaging film are of less importance. The three-layer packaging material structures described therein—PE sealing layer/opaque core layer/high-strength layer, preferably polyester or paper/aluminium foil/PE—are accordingly also of a rigidity which is too great for a dental X-ray film package.

The object of the present invention consequently lay in the provision of a packaging film of the greatest possible softness and flexibility for photosensitive material, in particular dental X-ray films which, however, simultaneously excelled in good mechanical strength, low abrasion and good resistance to mechanical damage. The film should additionally exhibit light-shielding properties, but be transparent to X-rays, impermeable to saliva and microorganisms and neutral in odour and taste. Further requirements of the packaging material were economical processability when forming the packaging units on packaging machinery and its ability to be welded under the influence of pressure and heat or of a high frequence field. The packaging material should exhibit improved mechanical properties to enable a reduction in the required film thickness, and hence also a reduction in the proportion of the product comprising packaging, and should be recovered by mechanical recycling after use.

Surprisingly, it was possible to achieve this object by manufacturing a multilayered film based on thermoplastic polyurethane (TPU).

SUMMARY OF THE INVENTION

The present invention provides consequently a TPU film having at least two layers and the use thereof for manufacture of packaging units for photosensitive material, in particular dental X-ray films, characterised in that the TPUs utilised for the respective layer have a hardness of less than 95 Shore A, the difference in hardness between all TPUs used within a layer and among the layers is less than 15 Shore A, at least one of the layers contains at least one light-shielding material, the sum of the proportions by weight of all light-shielding materials in the film is at least 3%, calculated on the weight of the film, and the layers are bonded to one another by glueing, coextrusion or under the influence of heat and pressure.

The essential inventive thinking comprises tailoring a TPU film which combines in ideal manner a high degree of softness, light-shielding and welding properties strength and puncture resistance for use as described and with a view to being mechanically recyclable simply and with the greatest possible versatility.

PREFERRED EMBODIMENTS

Suitable structural components for the TPUs are described in detail in EP-PS 0 129 193, but are also to be found in the relevant polyurethane literature (for example Polyurethane Elastomer, by C. Hepburn, Applied Science Publisher Ltd., Barking, Essex, England, 1982). Aromatic TPUs are preferably utilised, wherein the TPUs used for the individual layers may differ in chemical structure. The preparation of at least one layer from a blend of TPU types is also conceivable. Use of TPUs having a hardness of less than 95 Shore A ensures a high degree of softness in the film.

At least one layer of the TPU film according to the invention contains at least one light-shielding material. This includes all substances which impede the passage of light of wavelengths causing unwelcome exposure of the photosensitive material through the layer, and are dispersible in the thermoplastic melt. Examples of these are colouring pigments such as carbon black, iron oxide or titanium dioxide, fillers such as talcum, calcium carbonate or metal particles and dyes such as phthalocyanine or cobalt blue.

A preferred embodiment provides for the use of carbon black having an average particle size of less than 20 nm. In this way a uniformly good dispersion of the particles in the thermoplastic matrix is achieved, and hence also a reproducibly high degree of light-shielding in the layer.

The light-shielding material content within a layer is between 0.5 and 15 wt. %, preferably between 2 and 10%. This may be mixed into the TPU directly in the form of powder, liquid or paste, or be added, already incorporated into a plastics matrix, in the form of a master batch.

In order further to improve the light-shielding properties of the film it is expedient to provide at least one further TPU layer containing light-shielding material, which is also incorporated in the manner described above.

The latter should furthermore colour the layer, preferably in a colour or in a shade of grey which is clearly distinct from the first layer, in order when designing the packaging unit to offer a simple way of characterising the face and the reverse side and giving greater freedom of design in terms of colour.

A white pigment, such as for example titanium dioxide, is preferably utilised for the purpose in a proportion by weight which ranges from 0.5 to 15%, preferably from 2 to 10%, based on the layer.

According to the invention the sum of the proportions by weight of all light-shielding materials in the film is at least 3%, calculated on the weight of the film, and is therefore greater than the proportion in which these substances are conventionally incorporated—if at all—in thermoplastic polyurethane films.

For, depending on the thickness of the film, the addition of 0.5 to 2% of carbon black would, for example, impart to the film an obscuring black coloration.

As a result of the increased proportion of light-shielding material, the film meets in particularly large measure the requirement that a packaging material for films be opaque.

In addition to the light-shielding material additives may also be incorporated in conventional quantities in the TPU of the respective layer. This may take place during TPU production and during manufacturing of the film. Examples of conventional additives which may be mentioned are lubricants, anti-blocking agents, inhibitors, stabilisers against hydrolysis, light or heat, and inorganic and/or organic fillers.

The literature contains more detailed information regarding the above-mentioned additives, for example "High Polymers", Vol. XVI, Polyurethanes, parts 1 and 2, by J. H. Saunders and K. C. Frisch, Interscience Publisher, New York, 1962 and 1964 respectively, or the "Kunststoff-Taschenbuch" [Pocket manual of plastics] by Hansjürgen Saechtling, Hanser, Munich, Vienna, 1989, pp. 53 to 61.

The TPU layers may be manufactured by melt extrusion, optionally by addition of light-shielding material and further additives. Suitable processes are cast film extrusion, but preferably also blown film extrusion.

TPU processing by extrusion is discussed in the specialist literature, for example "Kunststoff-Handbuch" [Manual of plastics], Vol. VII, Polyurethanes, by Becker and Braun, Hanser, Munich, Vienna, 1983, pp 433/434.

The individual layers may, after extrusion, be bonded to one another to form a composite film by the action of pressure and heat or by glueing. However, simultaneous coextrusion of at least two layers is preferred utilising equipment known as multi-layer extrusion tools.

The film according to the invention may be pre-treated on one or both sides in the conventional manner, in particular by a corona, fluorine or plasma pre-treatment. If a film is manufactured by subsequent bonding of individual films, the pre-treatment step is also possible in respect of the individual film. It is then particularly advantageous if the individual films are to be laminated using adhesives because, as is known, pre-treatment of the film surface increases its receptiveness to adhesives.

The total thickness of the film according to the invention is between 30 and 300 μm, preferably, however, between 80 and 200 μm. The thickness of the individual layers is from 15 to 285 μm, preferably from 30 to 170 μm.

A preferred embodiment of the film according to the invention provides for a layer of a TPU having a hardness of between 90 and 95 Shore A and another of a TPU having a hardness of between 70 and 90 Shore A, the light-shielding material being preferably incorporated into the harder TPU and the softer TPU forming the outer layer of the pack. The harder TPU thus contributes increased resistance to tearing and puncture, and the softer one to improved user appeal.

Since thermoplastically processable polyurethanes are utilised for its manufacture, mechanical recycling of the packaging film is possible in simple manner: the film is shredded and under some circumstances re-granulated, and the regranulate is then once again extruded.

With a view to providing versatile mechanical recyclability, the TPU types of the individual layers should be as similar in chemistry as possible, i.e. be composed of the same components (isocyanate, long-chain and short-chain polyol) and should differ from one another in terms of hardness by less than 15 Shore A. When differences in hardness are greater, there is increased incidence of incompatibility between the TPUs, which may be manifested, for example, by formation of harder inclusions in a softer matrix.

Because the film is as a rule adjusted to be multi-coloured, and because of the increase in the number of gel particles which is frequently observed in multiple TPU extrusion, when the material is recycled to the film packaging application it may require enclosure in layers of new material.

The composite TPU film according to the invention is suitable for manufacture of packaging units for photosensitive material, in particular dental X-ray films. The package may be constructed in conventional manner as any one of a number of embodiments of bag. Examples of this are given in GB-PS 020 183, DE-PS 632 041 or EP-PS 0 316 520.

The individual film parts may be bonded to form a packaging unit by the methods which are known for plastics films, preferably, however, by welding under the influence of pressure and heat or of a high-frequency field.

In addition to the photosensititive material, further inserts of, for example, cardboard or lead foil may be inserted into the package.

DRAWINGS AND EXAMPLES

Figure 2:
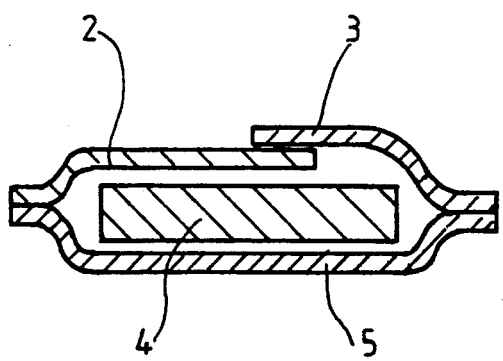

The subject of the invention will be further elucidated with the aid of the Examples which follow herein below in conjunction with the accompanying drawings wherein:

FIG. 1 is a front view of a package comprising an envelope formed of film in accordance with the present invention; and FIG. 2 is a longitudinal sectional view through the package of FIG. 1.

As seen in FIG. 2 a material 4 is enclosed in the package 1 formed of three film strips 2, 3 and 5 bonded at their edges.

EXAMPLES 1 TO 4, COMPARATIVE EXAMPLES 1 AND 2

Example 1

A two-layer TPU blown film was manufactured by coextrusion. The basic raw material of both layers was the same aromatic PU ester type having a hardness of 93 Shore A, an MFI (melt flow index) of 18 g/10 min measured at 190° C. and a bearing weight of 8.7 kg.

1.5% silica and 0.5% wax were admixed to both layers as additives via a polyurethane-based anti-blocking batch. One layer was provided with 5% carbon black having an average particle size of 10 nm, and the other with 6% titanium dioxide as a colouring pigment. These were in each case introduced via a polyurethane-based master batch.

The thickness of the layers was in each case 90 μm.

Tear resistance, percentage elongation at break, light-shielding properties and Shore A hardness of the film are shown in Table 1.

Example 2

A two-layer TPU blown film was manufactured by coextrusion. The basic raw material of both layers was the same aromatic PU ester type having a hardness of 86 Shore A, a melt flow index of 22 g/10 min measured at 200° C. and a bearing weight of 10 kg.

Additives, carbon black and titanium dioxide were added as in Example 1 in terms of type, quantity and method of incorporation.

The thickness of the layers was in each case 70 μm.

Tear strength, percentage elongation at break, light-shielding properties and Shore A hardness of the film are shown in Table 1.

Example 3

A two-layer TPU blown film was manufactured analagously to Example 2, with both layers being, however, only 50 μm thick.

The proportion of silica and wax in the two layers was increased to 2.0% and 0.6%.

The carbon black concentration of the black layer was now 5.5%, with the titanium dioxide content unchanged at 6% in the white layer.

Tear resistance, percentage elongation at break, light-shielding properties and Shore A hardness of the film are shown in Table 1.

Example 4

A two-layer TPU blown film was manufactured by coextrusion. The basic raw material of the first layer was the harder TPU described in Example 1, and that of the second layer the softer TPU described in Example 2.

2.0% silica and 0.6% wax were admixed to both layers analagously to Example 3.

The harder TPU layer was provided with 5.5% carbon black, and the softer with 6% titanium dioxide.

The thickness of both layers was in each case 50 μm.

Tear resistance, percentage elongation at break, light-shielding properties and Shore A hardness of the film are shown in Table 1.

Comparative Example 1

The packaging film of a conventional commercial dental X-ray film package was examined.

It was a two-layer soft PVC film of 190 μm total thickness. One layer was coloured black and the other white. The structure was symmetrical in terms of thickness.

Tear resistance, percentage elongation at break, light-shielding properties, and Shore A hardness of the film are shown in Table 1.

Comparative Example 2

The packaging film of a conventional commercial dental X-ray film package was examined.

It was once again a two-layer, black/white soft PVC film which, however, had a markedly softer feel relative to the film in Comparative Example 1.

The total thickness of the film was 175 μm, with symmetrical distribution of layer thickness.

Tear resistance, percentage elongation at break, light-shielding properties and Shore A hardness of the film are shown in Table 1.

Comparative Example 3

A two-layer TPU blown film was manufactured analogously to Example 2, with one layer containing, however, 2.5% instead of 5% carbon black.

Tear resistance, percentage elongation at break, light-shielding properties and Shore A hardness of the film are shown in Table 1.

Evaluation of the results according to Table 1

It is clearly entirely possible to manufacture soft PVC films of a high degree of softness when the composition is appropriately selected (see Shore A hardness of Comparative Example 2).

The films based on TPU according to the invention, however, excel in high strength and extensibility at the same shore hardness, with simultaneously markedly reduced film thickness.

Therefore, they reduce the proportion of the packaging material, but still offer an at least equal protection of the photographic material against damage. Thus, in combination with their softness and light-shielding properties, they are most eminently suitable in particular for packaging dental X-ray films.

TABLE 1

Comparison of the Properties of the films in accordance with Examples 1 to 4 and Comparative Examples 1 and 2

| | Basis of raw material | Film thickness (μm) | Tear resistance (MPa) | Percentage elongation at break | Shore A hardness of film | Light-shielding properties |
|---|---|---|---|---|---|---|
| Example 1 | TPU | 180 | 70 | 425 | 89 | good |
| Example 2 | TPU | 140 | 57 | 505 | 81 | good |
| Example 3 | TPU | 100 | 60 | 480 | 81 | good |
| Example 4 | TPU | 100 | 68 | 430 | 83 | good |
| Comparative Example 1 | PVC | 190 | 22 | 200 | 95 | good |
| Comparative Example 2 | PVC | 175 | 20 | 235 | 82 | good |
| Comparative | TPU | 140 | 60 | 495 | 81 | poor |

TABLE 1-continued

Comparison of the Properties of the films in accordance with Examples 1 to 4 and Comparative Examples 1 and 2

| | Basis of raw material | Film thickness (μm) | Tear resistance (MPa) | Percentage elongation at break | Shore A hardness of film | Light-shielding properties |
|---|---|---|---|---|---|---|
| Example 3 | | | | | | |

Test methods:
Tear resistance, percentage elongation at break: DIN 53 455/5
Test velocity: 200 mm/min
Distance between grips: 50 mm
Shore hardness: DIN 53 505
Light shielding properties: The packaging films were welded together to enclose commercially available X-ray film packs comprising photographic material, cardboard and lead foil inserts. The so produced packages were exposed to light on an eluminated table for 24 hours. After that the photographic material was developed.
Rating:
good, if photographic material was black, i.e. unexposed
poor, if photographic material was white or grey, i.e. exposed.

We claim:

1. A film comprising at least two thermoplastic polyurethane (TPU) layers, wherein
the TPUs in the layers have a hardness of less than 95 Shore A,
at least one of the layers contains at least one light-shielding material,
the sum of the proportions by weight of all light-shielding materials in the film is at least 3%, calculated on the weight of the film, and
the layers are directly bonded to one another by coextrusion or by heat and pressure.

2. A film according to claim 1, wherein the TPUs in at least one layer have a hardness between 90 and 95 Shore A and the TPUs in at least one further layer have a hardness between 75 and 90 Shore A.

3. A film according to claim 1, wherein the light-shielding material comprises at least one member selected from the group consisting of a pigment, dye and filler.

4. A film according to claim 1, wherein the light-shielding material comprises carbon black.

5. A film according to claim 1, wherein the light-shielding material content of one layer is between 0.5 and 15 wt. %, calculated on the weight of such layer.

6. A film according to claim 1, wherein two layers contain light-shielding material, the color or grey shade of one such layer being clearly distinct from that of the other such layer.

7. A film according to claim 6, wherein the light-shielding material in one such layer contains carbon black and in the other such layer comprises a white pigment.

8. A film according to claim 1, wherein at least one layer of the film contains recycled material from another such TPU film.

9. A film according to claim 8, comprising at least three layers, the recycled TPU material-containing layer being positioned between two layers containing no recycled material.

10. A film according to claim 1, wherein the TPU's of all the layers are of substantially the same composition with regard to isocyanate and polyols from which they are formed.

11. A film according to claim 1, wherein the film or at least one of its layers is subjected to a corona, fluorine or plasma pre-treatment.

12. A film according to claim 1, wherein the thickness is between 30 μm and 300 μm.

13. A film according to claim 1, wherein the thickness of each layer is between 15 μm and 285 μm.

14. Photosensitive material packaged in a film according to claim 11.

15. A package according to claim 14, wherein the photosensitive material is X-ray film.

* * * * *

UNITED STATES PATENT AND TRADEMARK OFFICE
CERTIFICATE OF CORRECTION

PATENT NO. : 5,395,681

DATED : March 7, 1995

INVENTOR(S) : Hargarter, et al.

It is certified that error appears in the above-identified patent and that said Letters Patent is hereby corrected as shown below:

Col. 10, line 42  Delete claim " 11 " and substitute -- 1 --

Signed and Sealed this

Twenty-third Day of May, 1995

Attest:

Attesting Officer

BRUCE LEHMAN

Commissioner of Patents and Trademarks